Dec. 7, 1971  D. C. WILSON  3,625,712
CONTROL OF DIFFUSION OF GASES IN POUCHES
Filed Nov. 20, 1969  6 Sheets-Sheet 5
FIG_13
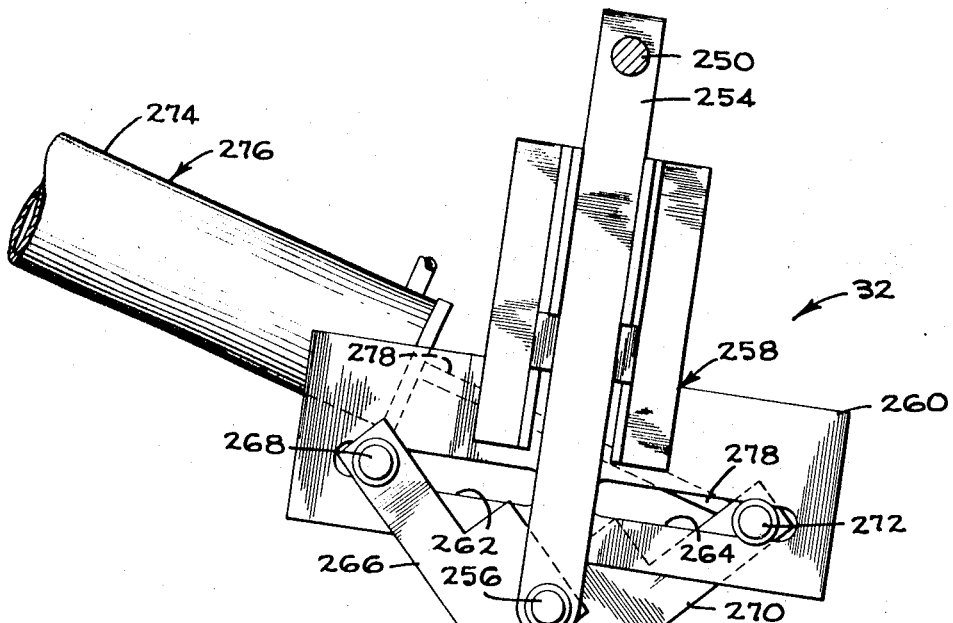
FIG_13A
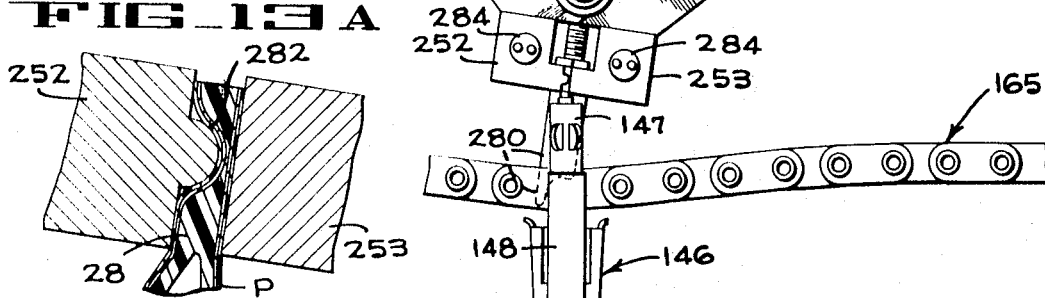
FIG_14
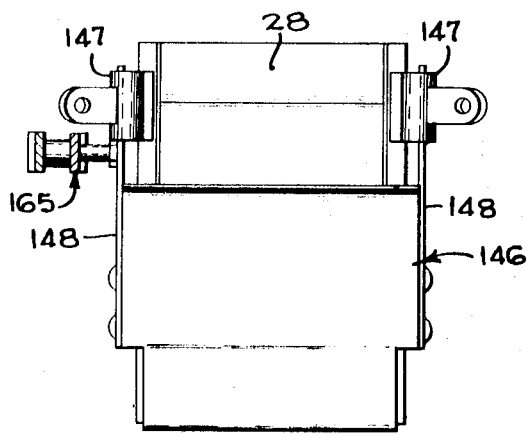
FIG_12
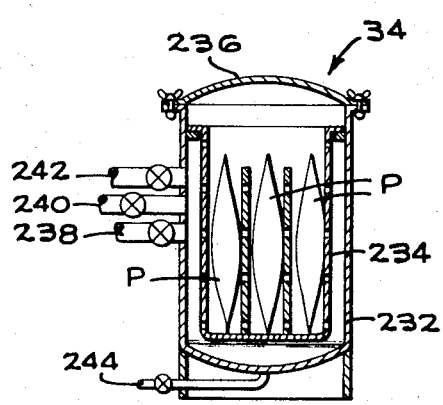

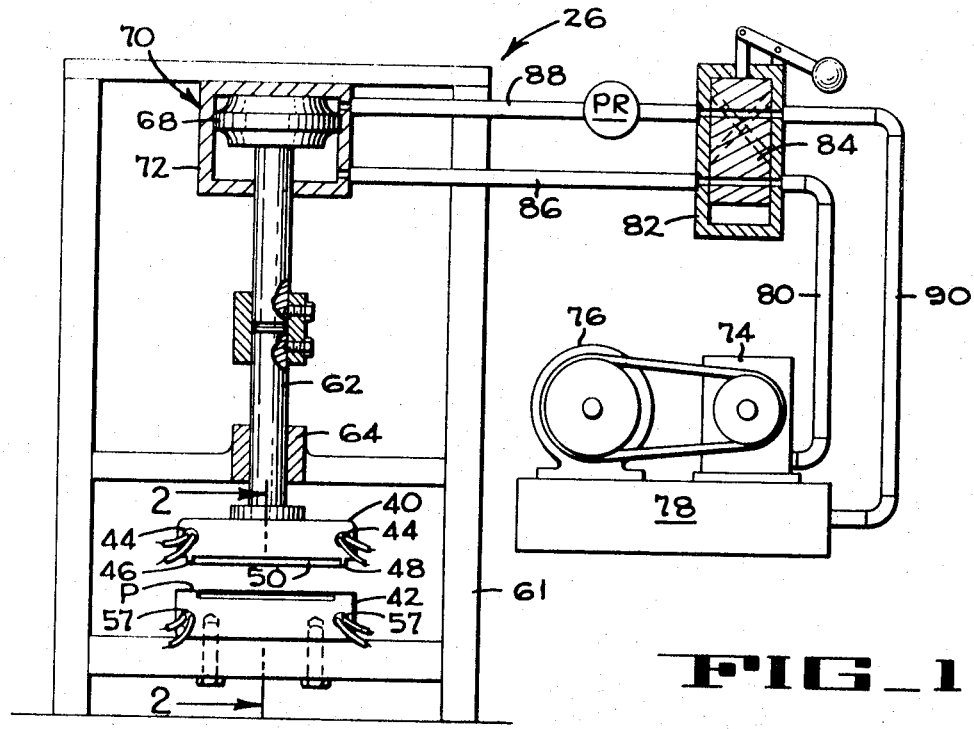
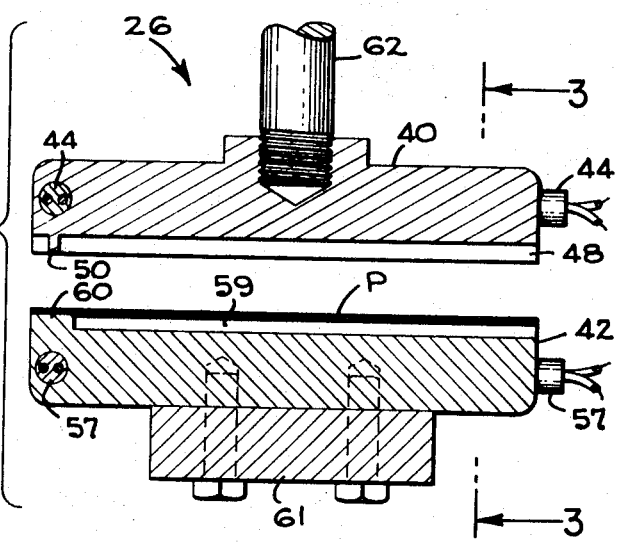
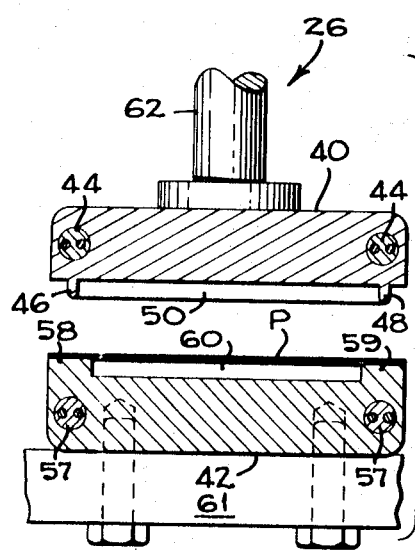
FIG_1
FIG_2
FIG_3
INVENTOR.
DONALD C. WILSON
BY F. W. Anderson
C. C. Tripp
ATTORNEYS

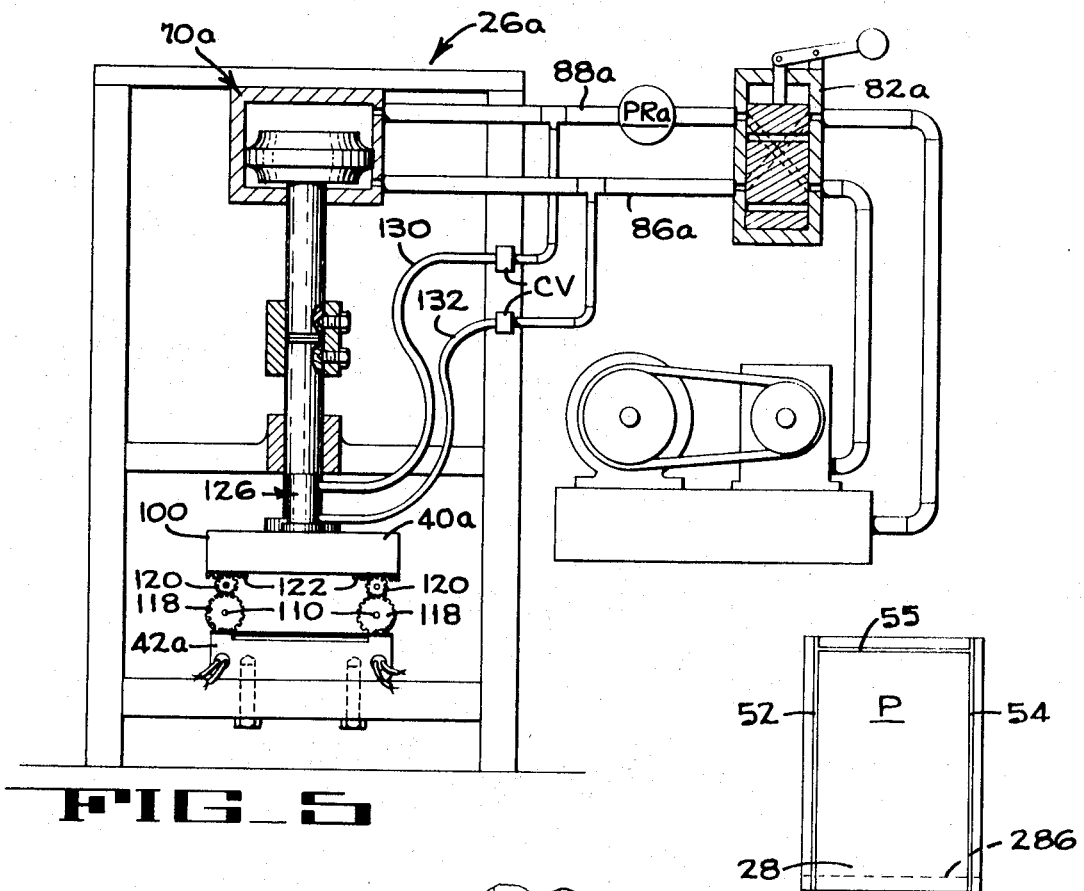
FIG. 5
FIG. 4
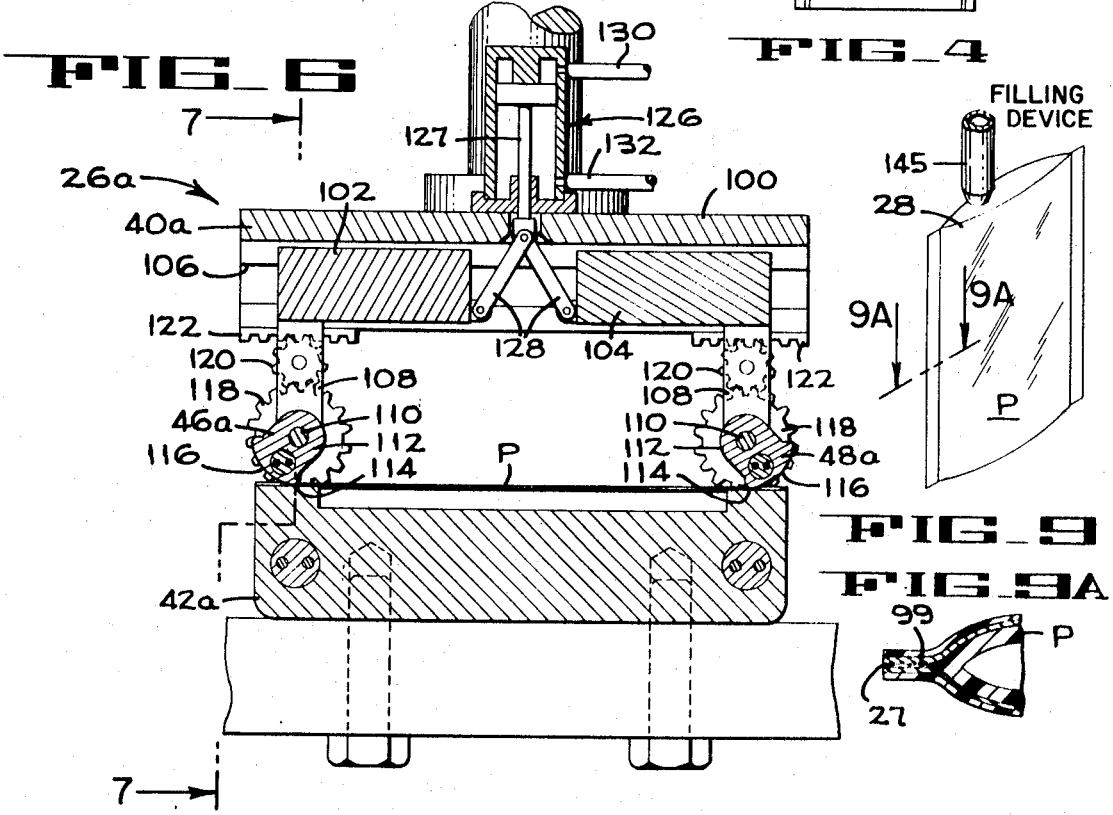
FIG. 6
FIG. 9
FIG. 9A

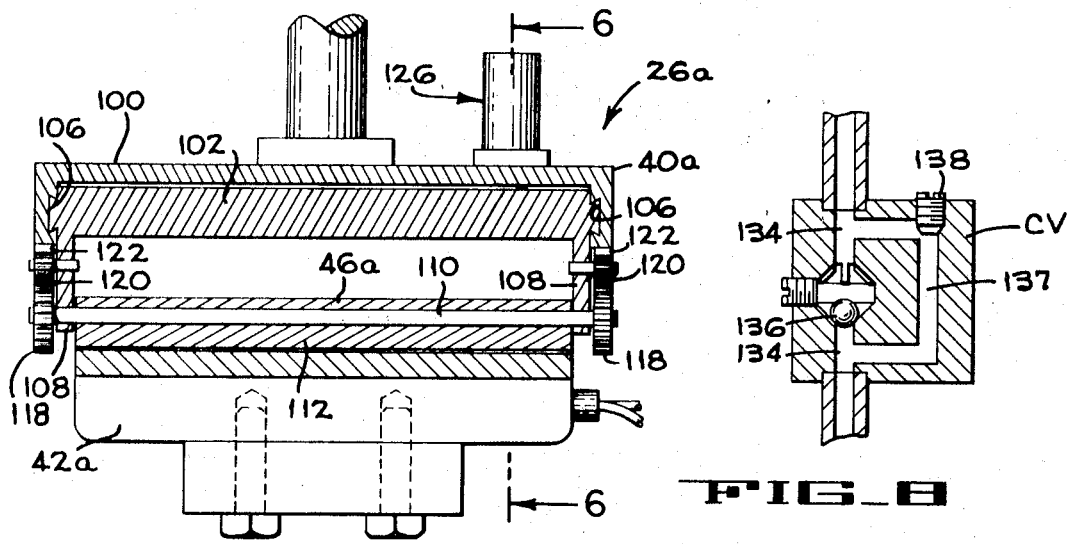
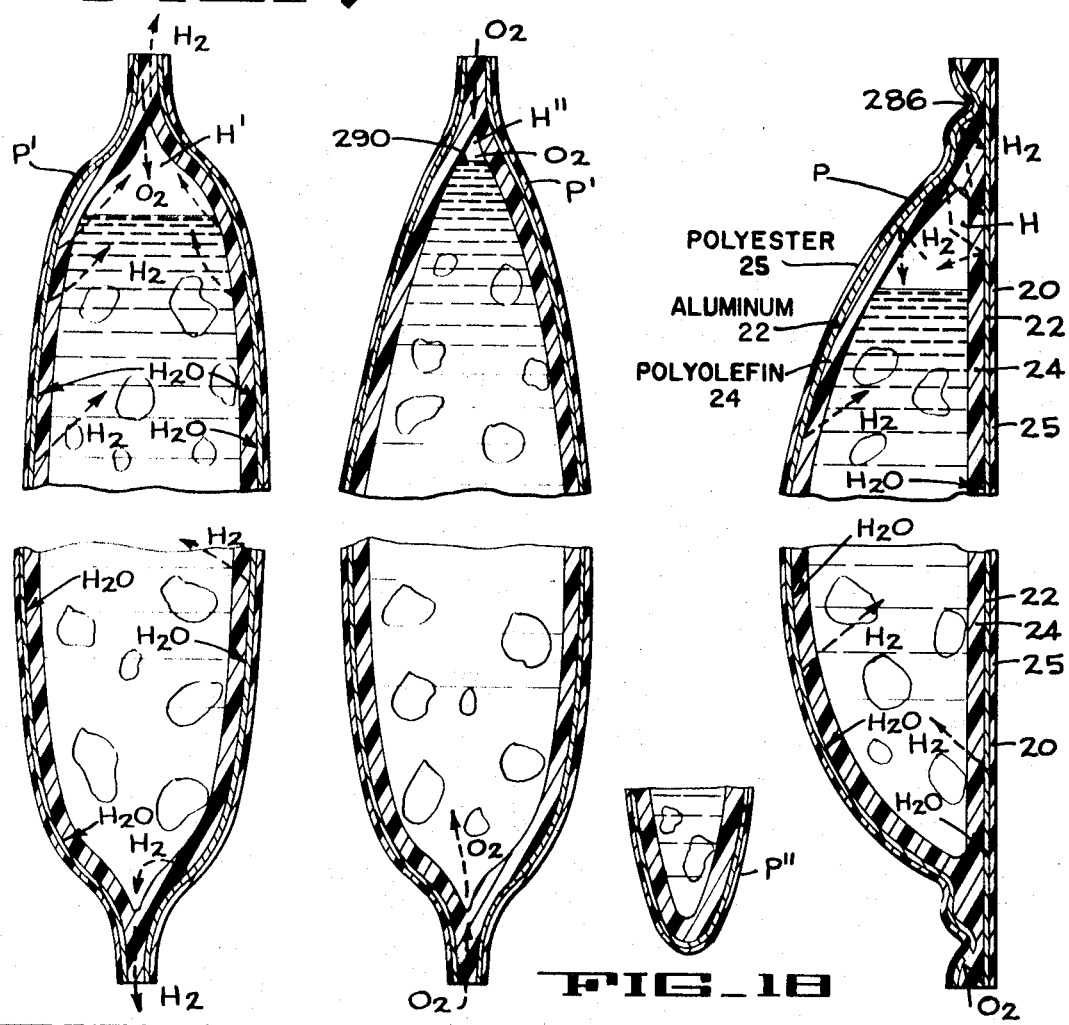

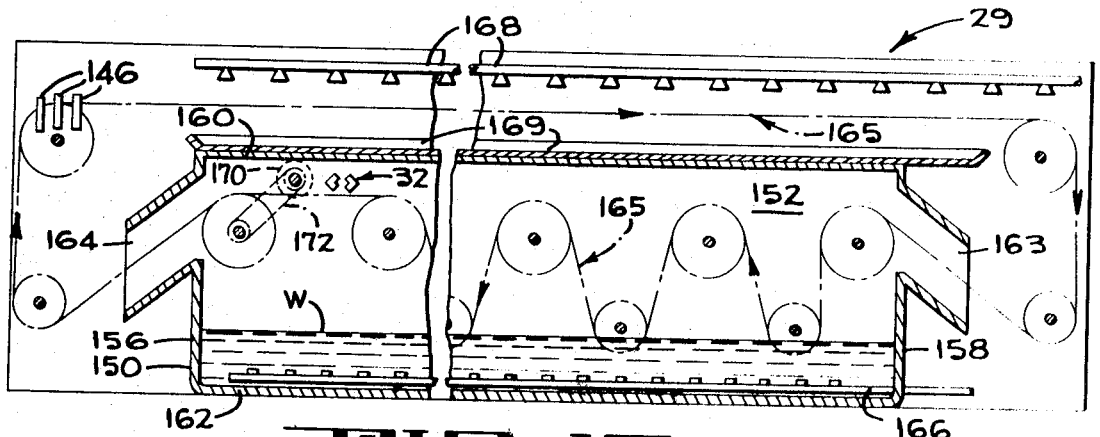
FIG_10
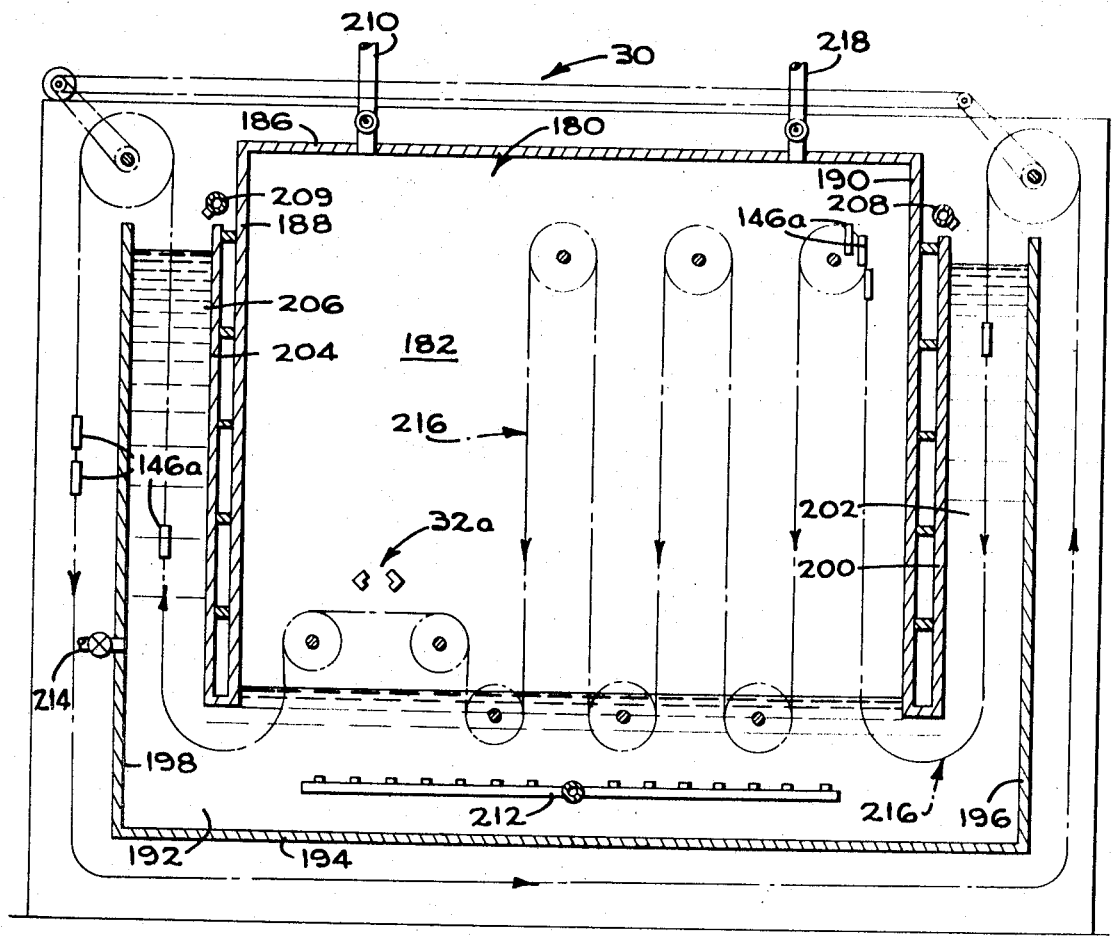
FIG_11

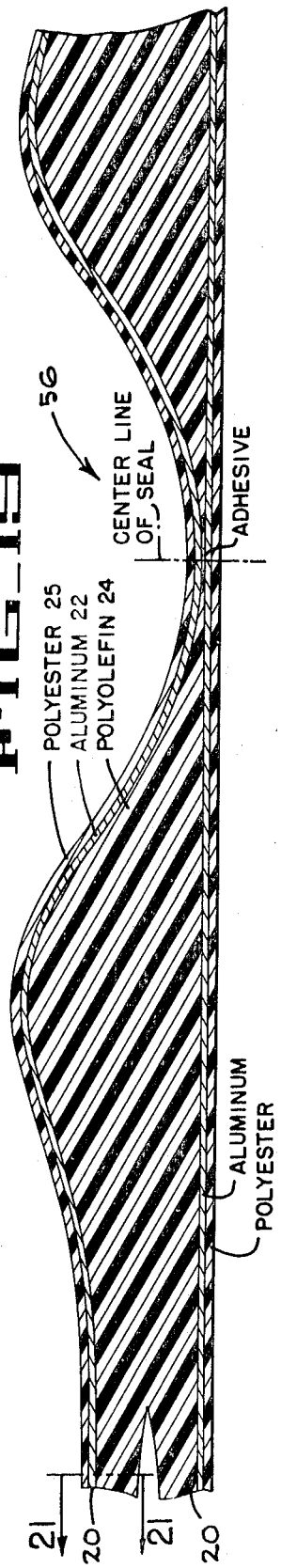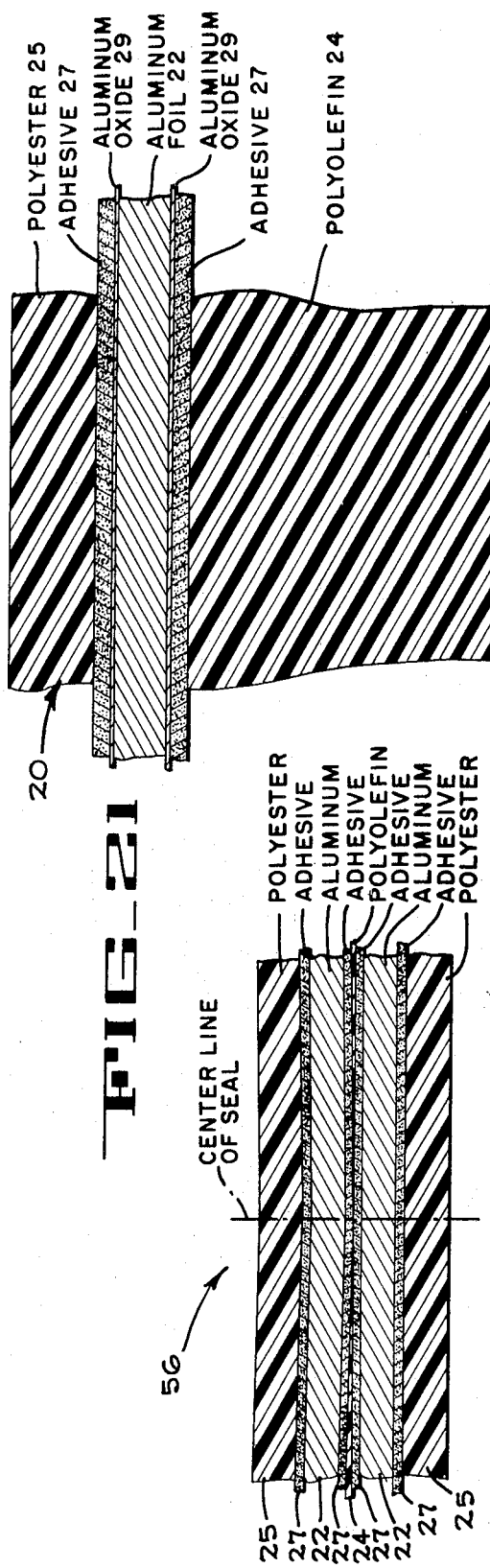

United States Patent Office 3,625,712
Patented Dec. 7, 1971

3,625,712
CONTROL OF DIFFUSION OF GASES IN POUCHES
Donald C. Wilson, San Jose, Calif., assignor to
FMC Corporation, San Jose, Calif.
Filed Nov. 20, 1969, Ser. No. 878,503
Int. Cl. B65b 39/00
U.S. Cl. 99—171 H          16 Claims

ABSTRACT OF THE DISCLOSURE

Method, apparatus, and article of manufacture for controlling the diffusion of gases such as hydrogen out of sealed laminated pouches and the diffusion of gases such as oxygen into the sealed pouches, which pouches include an aluminum layer bonded to at least an inner layer of heat sealable plastic. During formation and sealing of the pouches the sealed edges of the pouches are compressed between opposed heated sealing bars, with at least one of the bars having a convex pouch contacting surface, the sealing force and temperature being sufficient to extrude the plastic sealant away from the sealed area allowing the aluminum layers of the two pouch walls to be moved substantially into aluminum to aluminum contact with each other and to establish a substantially continuous aluminum envelope around the contents of the pouches. The pouches are also filled with a water containing product and are heated to a sterilizing temperature which forms aluminum oxide on the aluminum surfaces which oxide prevents diffusion of gases out of or into the pouches by providing a substantially continuous gas inhibiting barrier or envelope around the contents of the pouches.

CROSS REFERENCE TO RELATED APPLICATIONS

The heat treatment of flexible containers or pouches of the type used in the present invention is related to the methods and apparatus disclosed in my copending applications Ser. Nos. 693,330 and 772,321, now Pat. No. 3,501,318 which issued on Mar. 17, 1970, and Pat. No. 3,528,826 which issued on Sept. 15, 1970, respectively. The method and apparatus is also related to an application filed on Sept. 23, 1969 and identified application Ser. No. 860,335; and in my applications Ser. Nos. 878,499 and 878,504 filed on even date herewith. All of the above mentioned applications are assigned to the assignee of the present invention.

BACKGROUND OF THE INVENTION

Field of the invention

The present invention relates to the art of packaging products in flexible containers, better known as pouches, and more particularly relates to a method, apparatus, and article of manufacture for controlling the diffusion of gases into or out of sealed pouches.

Description of prior art

It is well known to sterilize food products such as fruits, vegetables, or meats in flexible pouches that are formed of two laminated walls each of which includes an aluminum layer that is bonded to inner and outer layers of plastic material. The inner layer of each wall of these plastic-foil pouches are defined by a heat sealable plastic; and the pouches may either be evacuated and sealed prior to sterilization, or may be sterilized prior to sealing in a manner fully disclosed in my aforementioned copending applications Ser. Nos. 693,330 and 772,321, now Pat. Nos. 3,501,318 and 3,528,826.

Heretofore, the edges and mouth of the pouches were normally sealed by subjecting them to sealing bars heated to a relatively high temperature and at a sealing pressure which was low enough to prevent extrusion of the plastic layer from the sealed area. However, U.S. Pat. No. 3,078,201 which issued to H. W. Christie on Feb. 19, 1963 discloses a seam structure which has the inner plastic layer extruded away from a seam line to form a seam strengthening fillet.

SUMMARY OF THE INVENTION

In accordance with the method and apparatus of the present invention, it has been discovered that when certain commercially available pouches are filled with water or with a water containing product and are heated to a sterilizing temperature, the water diffuses through the inner plastic layers as discrete molecules to form aluminum oxide on the inner surfaces of the aluminum walls and to form hydrogen which diffuses back through the inner plastic layers and accumulates within the pouches.

With pouches that have been sealed in the conventional manner mentioned above, it has been discovered that the hydrogen gradually diffuses out of the pouches through the inner plastic layer at the sealed edges and that oxygen gradually diffuses into the sealed containers through said sealed edges. It is further recognized that the aluminum oxide layers formed on the walls of each pouch greatly minimize the diffusion of these gases to such an extent that for all practical purposes no gas is able to diffuse through the aluminum oxide layers formed on the pouch walls. Accordingly, the present invention incorporates the basic concept of forming and sealing the pouches in such a manner that a substantially uninterrupted aluminum oxide shield or barrier is formed around the product.

It is specifically within the scope of the invention to provide a filled and sealed plastic-aluminum laminated pouch formed in accordance with the above method for preventing gases from diffusing between the interior of the pouches and the outer atmosphere.

It is also recognized that the present method of forming diffusion inhibiting pouches and the pouches themselves are applicable to package a non-aqueous product. When such a product is packaged in a pouch and is heated by an aqueous heat treatment medium contacting the external surfaces of the pouches aluminum oxide will form on the outside surfaces of the aluminum to form a barrier which will prevent oxygen in any appreciable amount to enter the sealed pouch.

BRIEF DESCRIPTION OF THE DRAWINGS

FIG. 1 is a diagrammatic elevation with parts in section of a first embodiment of a pouch forming apparatus of the present invention.

FIG. 2 is an enlarged section taken along lines 2—2 of FIG. 1.

FIG. 3 is a section taken along lines 3—3 of FIG. 2.

FIG. 4 is a plan illustrating the seams of a pouch formed by the aparatus of FIG. 1.

FIG. 5 is a diagrammatic elevation with parts in section of a second embodiment of a pouch forming apparatus.

FIG. 6 is an enlarged vertical central section taken along lines 6—6 of FIG. 7.

FIG. 7 is a section taken along lines 7—7 of FIG. 6.

FIG. 8 is a vertical central section taken through a speed control valve used with the apparatus of FIG. 5.

FIG. 9 is a perspective illustrating the seams of a pouch formed from one folded sheet by the apparatus of FIG. 5 and further illustrating a device for filling the pouch.

FIG. 9A is an enlarged section taken along line 9A—9A of FIG. 9 illustrating an edge of a pouch sealed by the apparatus of FIG. 5, the wall thickness of the pouch being greatly exaggerated.

FIG. 10 is a diagrammatic vertical section of an atmospheric sterilizer.

FIG. 11 is a diagrammatic vertical section of a superatmospheric sterilizer.

FIG. 12 is a diagrammatic vertical section of a superatmospheric batch type retort cooker.

FIG. 13 is a diagrammatic side elevation of a sealing head which may be used after the sterilization for sealing the mouth of the filled containers.

FIG. 13A is an enlarged section of the sealing surfaces of the sealing head of FIG. 13 illustrating the manner in which the mouth of the pouch is sealed, the wall thicknesses of the pouch and the diameter of the sealing bar being greatly exaggerated.

FIG. 14 is a diagrammatic transverse elevation of a pouch carrier arranged to provide a one-way valve in the supported pouch.

FIG. 15 is a diagrammatic vertical section taken through a filled and sterilized pouch which is sealed in the conventional manner, the thickness of the walls of the pouch being greatly exaggerated, said view illustrating the size of the head space immediately after sealing and cooling and further illustrating the manner in which gases diffuse through the inner plastic layer of the pouch walls.

FIG. 16 is a section of a conventionally sealed pouch which is similar to FIG. 15 but illustrates the reduction of headspace after several weeks of storage due to the faster diffusion of hydrogen out of the pouches than oxygen into the pouches.

FIG. 17 is a section similar to FIGS. 15 and 16 but illustrates a pouch sealed in accordance with the present invention thereby preventing diffusion of gases and retaining a headspace which is rich in hydrogen.

FIG. 18 is a section of a fragment of a pouch which is formed by a single folded sheet of laminate.

FIG. 19 is an enlarged section of a seam line taken wherein the scale of the thickness is 2½ times greater than the scale of the length.

FIG. 20 is an enlarged section taken at the center line of the seal of FIG. 19 and at a scale large enough to illustrate the adehsive layers in proportion to the layers of laminate.

FIG. 21 is an enlarged section taken along lines 21—21 of FIG. 19 taken at a scale large enough to illustrate the adhesive and aluminum oxide layers after 15 minutes of processing at 250° F. with water on both sides of the laminate.

DESCRIPTION OF THE PREFERRED EMBODIMENT

In general, the method of the present invention includes three broad steps. The first broad step comprises forming a diffusion controlling pouch P from two walls 20 (FIG. 17) of thermoplastic laminate, each wall including a central layer 22 of aluminum foil or the like bonded to an inner layer 24 of heat sealable thermoplastic and an outer layer 25 of protective plastic. If the pouches are each made from two separate sheets, three edges of the two walls 20 of each pouch are bonded together by a pouch forming apparatus 26 (FIGS. 1 to 3), in such a way that the inner plastic layer is extruded from the seam areas so as to cause the aluminum in one wall to substantially contact the aluminum in the other wall thereby forming an uninterrupted U-shaped seam at the seal or seam areas adjacent the three edges. Although an adhesive 27 (FIGS. 20 and 21) is applied between the aluminum and plastic films during formation of the laminate and this adhesive is not extruded from the seal areas, the adhesive 27 remaining in the seal area is on the order of 0.1 mil in thickness per wall and accordingly for all practical purposes the aluminum foil in the two walls are in actual aluminum-to-aluminum contact at the seal areas. It is to be understood that terms such as "in substantial aluminum-to-aluminum contact," means that the aluminum layers or aluminum oxide layers are separated only by this adhesive.

The second broad step comprises heat treating the pouches after being filled with a product, preferably a food product such as fruits, vegetables, or meat, for sterilizing the product and for forming a gas inhibiting barrier of aluminum oxide 29 (FIG. 21) on the surfaces of the aluminum in the pouches P. The sterilization may take place prior to sealing after a one-way valve has been formed across the open mouth 28 of each pouch as described in my aforementioned application Ser. No. 639,330 now Patent No. 3,501,318. The pouch may be sterilized either in an atmospheric sterilizer 29 (FIG. 10) or in a superatmospheric sterilizer 30 (FIG. 11) depending upon the type of food product within the pouch. Alternately, the filled pouches may be evacuated and sealed prior to sterilization by apparatus such as disclosed in Csernak application Ser. No. 459,768, which application which issued as Pat. No. 3,488,914 on Jan. 13, 1970 and is assigned to the assignee of the present invention; or by apparatus such as disclosed in Pat. No. 2,966,019 which issued to Grafingholt on Dec. 27, 1960.

The third broad step in the method of the present invention is to seal the mouth 28 of each evacuated pouch either prior to sterilization, or to seal the pouches which have one-way valves formed therein after sterilization or at some time during sterilization. The final sealing may be performed by a sealing mechanism 32 of the type diagrammatically illustrated in FIG. 13. Such sealing apparatus is fully disclosed in my aforementioned copending application Ser. No. 860,335. The pouches P which are evacuated and sealed prior to sterilization may be sterilized in a retort cooker 34 (FIG. 12) subject to an overriding air pressure which assures that the pressure externally of the pouches is greater than that generated within the pouches, and accordingly, prevents the pouches from rupturing due to a pressure unbalance during sterilization.

As mentioned above, the diffusion controlling pouches P (FIG. 17) are formed from a laminate which includes a central layer of aluminum foil or the like bonded to an inner layer of a heat sealable plastic and to an outer protective layer of plastic. The following laminated materials have been used successfully.

POUCHES (5" x 7")

| Type | Outer layer | Middle layer | Inner layer |
|---|---|---|---|
| C-79 (R-2) Continental Can Co. | 0.5 mil polyester. | 0.35 mil aluminum foil. | 2.5 mil white opaque polyolefin. |
| Dow PZ5511.16 | do | do | 3.5 mil high density polyethylene. |
| X-1084M 3M Company. | 0.9 mil polyester (unoriented). | Vacuum deposited metalized aluminum. | 1.8 mil oriented polyester (heat sealable.) |

Each diffusion controlling pouch P is preferably made from one sheet, rather than two separate sheets, of the plastic-aluminum laminate which is folded in half to define two interconnected walls 20 having the inner layers 24 of each of the two walls facing each other. It will be understood, however, that the pouches may be formed from two separate sheets of the plastic laminate as illustrated in FIG. 17, or that pouches that have already been formed by conventional methods may be reheated and sealed in accordance with the present invention to provide diffusion controlling pouches P.

The two sheets, or single folded sheet, from which each pouch is formed are placed in the pouch forming apparatus 26 (FIGS. 1 to 3) between a sealing head 40 and a cooperating anvil 42. The sealing head 40 is heated to between about 250° F. to 325° F., preferably about 300° F., by electrical coils 44 and the sealing pressure is applied for a period between about 2–6 seconds, preferably about 4 seconds. The coils 44 are disposed immediately adjacent two sharply curved side sealing bars 46 and 48 and an end sealing bar 50 which form interconnected side seams 52, 54, and an end seam 55 (FIG. 4), respectively. The sealing bars 46, 48 and 50 have a radius of curvature of less than about 1/16 of an inch. FIGS. 19 and 20 illustrate the different layers of laminate at seam line 56 when formed with a radius of curvature of 3/128 of an inch. FIG. 20 also shows the relationship of the adhesive layers 27 to the other layers at the seam 56.

The anvil 42 is also heated to the sealing temperature by electrical coils 57 which are disposed immediately adjacent two flat side sealing bars 58 and 69 and a flat end sealing bar 60, all of which are interconnected and are disposed immediately below the sealing bars 46, 48 and 50, respectively.

As illustrated in FIG. 1, the anvil 42 is rigidly secured to a frame 61 by bolts, and the sealing head 40 is rigidly secured to an upwardly extending stub shaft 62 that is slidably received in a hub 64 of the frame 61 and is held from rotation by a key and cooperating keyway. The stub shaft 62 is connected to the piston 68 of a hydraulic power unit 70 which has its cylinder 72 bolted to the frame. Hydraulic fluid is supplied to the cylinder 72 by a pump 74 that is driven by motor 76 and receives fluid from a sump 78. The high pressure fluid from the pump 74 flows through a conduit 80 that is connected to a four way valve 82 having a manually movable core 84 therein that is provided with parallel passages and cross passages. When the core 84 is in the illustrated parallel passage position, high pressure fluid from the conduit 80 flows through the valve 82 and through a conduit 86 into the lower end of the cylinder 72. Fluid on the upper end of the cylinder flows through a conduit 88 having a pressure regulator PR therein, through the valve 82, and through a conduit 90 to the sump 78. When the core 84 is moved to the cross passage position, high pressure fluids flows past the pressure regulator PR and into the upper end of the cylinder 72 to cause the sealing head 40 to move downwardly into sealing position. Fluid in the lower end of the cylinder 72 returns to the sump 78 through conduit 86, the valve 82, and conduit 80. As is well known in the art, the pressure regulator PR is adjusted to a suitable sealing pressure of about 7–20 pounds per linear inch of seal, which pressure has been determined to be sufficient to assure that the inner layers 24 of each wall will be extruded from the interconnected side and end seams resulting in the substantial contact of the aluminum layer 22 of one wall with the aluminum layer 22 of the other wall at the seam thus providing, for all practical purposes, a complete aluminum barrier around the pouch except for the open mouth of the pouch.

Since the sealing bars 46, 48 and 50 have a radius of curvature that is less than about 1/16", it is recognized that the substantial aluminum-to-aluminum contact of the side seams 52 and 54 and end seams 55 make little more than line-to-line contact. It is, of course, recognized that the heated polyolefin on either side of the line contact provides seams of sufficient physical strength to permit commercial handling of the so formed pouches P.

If it is desired to form seams having wider areas of substantial aluminum-to-aluminum contact, the diffusion controlling pouches P may be formed by a second embodiment of the pouch forming apparatus 26a (FIGS. 5–7). Since many parts of the apparatus 26a are similar to the apparatus 26, only the parts which differ will be described in detail and parts of the apparatus 26a which are similar to those of the apparatus 26 will be assigned the same numerals followed by the letter "a."

The primary difference between the apparatus 26 and the apparatus 26a is that the apparatus 26a includes side seam sealing bars 46a and 48a that are rotatably mounted so that during the pouch forming operation they make initial contact inwardly of the edges of the pouch being formed and are thereafter rolled outwardly to the outer edges so that substantially all of the inner polyolefin material is extruded from the seam areas. Seams 99 (FIG. 9A) made in this manner provide substantial aluminum-to-aluminum contact which may be on the order of 1/8" to 3/8" wide with the two contacting surfaces of aluminum being securely bonded to each other by virtue of the aforementioned very thin layers of adhesive 27 disposed therebetween.

As shown in FIGS. 5, 6 and 7, the sealing head 40a is urged downwardly against an anvil 42a by the hydraulic power unit 70a. The sealing head 40a comprises a main body 100 having a pair of side sealing bar carriages 102 and 104 that are slidably supported on the body by dovetail mortices 106 (FIG. 7). Each carriage includes a pair of downwardly projecting legs 108 upon which is journaled a shaft 110 secured to and projecting from the ends of a sealing bar 112. Each sealing bar 112 is longer than the edge being sealed and includes a rather sharply curved inner edge 114 which leads into a shallower, plastic extruding curved surface 116. Each sealing bar 112 has a pinion 118 secured to both ends of the shaft 110 which pinion meshes with an idler 120 journaled on the adjacent leg 108 which in turn meshes with a rack 122 secured to the main body 100. Since the curvature of the shallow curved surface 116 is substantially the same as that of the pinion 118, outward movement of each carriage 102 and 104 will cause its associated sealing bar 112 to roll along the contacted edge of the pouch being sealed. A hydraulic power unit 126 is secured to the sealing head 40a and has its piston rod 127 (FIG. 6) extending through an opening in the body 100. The piston rod 127 is pivotally connected to the carriages 102 and 104 by linkages 128. The power unit 126 is connected to the conduits 88a and 86a by conduits 130 and 132 each having speed control valves CV (FIGS. 5 and 8) therein. Each speed control valve CV is oriented as shown in FIG. 8 so that when high pressure fluid moves downwardly, it will be prevented from flowing through an unrestricted main passage 134 by a ball valve 136 and, accordingly, will flow only through a restricted passage 137 having an adjustable needle valve 138 therein. Flow in the opposite direction will raise the ball valve 136 from its seat and accordingly will permit unrestricted flow of fluid therethrough.

In operation of the pouch forming apparatus 26a, the sealing bars 46a and 48a, and the anvil 42a are heated to a temperature of between about 250° F. to 325° F., preferably about 300° F. The four-way valve 82 (FIG. 5) is then shifted to the illustrated cross-passage position urging the sealing bars 46a and 48a against the areas of the pouches being seamed with a pressure of about 7–20 pounds per linear inch as controlled by the pressure regulator PRa. The speed control valves CV are set to restrict the flow of high pressure fluid into the power unit 126 thereby assuring that the full sealing pressure will be applied before the sealing bars 112 commence to roll outwardly. The speed control valves CV are adjusted so that about 2 to 6 seconds elapses before the bars 112 have completed their rolling movement over the outer edge of the seams being formed. This rolling movement extrudes all of the heat sealable polyolefins, which polyolefins include polyethylene, of the inner layers from the seam area and provides pouch edges that are flat and are in substantial aluminum-to-aluminum contact. As mentioned previously, the width of the seams may be of any desired width, however, a width of between about 1/8" and 3/8" have been found to be adequate. The four-way valve 82a is then shifted to the parallel passage position which causes the sealing head 40a to immediately move upwardly away from the pouch. The flow of high pressure fluid is restricted by the speed control valve CV in the conduit 132 thus causing the return of the carriages 102 and 104 to the illustrated retracted position after the sealing bars 112 have been lifted free from the pouch. As mentioned previously, most pouches are formed from a single sheet of laminate which is folded at a bottom edge to provide two mating walls. Since an aluminum barrier is already provided at the bottom edge, it is recognized that no additional form of seal is required in this area.

After the pouches P have been formed as above described, they are filled with a product such as fruit, vegetables or meat by any suitable filling device 145 as diagrammatically illustrated in FIG. 9.

In accordance with one embodiment of the invention, pouches filled with a high acid product such as fruit are sterilized in the atmospheric sterilizer 29 (FIG. 10) after first being clamped in carriers 146 (FIG. 14) which includes spring clips 147 that are clamped to the side seams of the mouth of the pouch and are urged away from each other by a leaf spring 148 thereby providing a one-way valve across the mouth 28 of each pouch.

The atmospheric sterilizer 29 (FIG. 10) comprises a housing 150 defined by side walls 152 (only one being shown), end walls 156 and 158, a roof 160 and a floor 162 all secured together in fluid tight relationship as by welding. A downwardly inclined inlet tunnel 163 which also serves as a gas vent is formed in the end wall 158, and a similar downwardly inclined discharge tunnel 164 is formed in the end wall 156 to permit an endless conveyor 165 to pass therethrough and to partially trap steam within the housing 150. The lower portion of the housing is filled with water W which is heated to about 212° F. by steam from a manifold 166. After the conveyor 165 has moved the pouches P through the hot water W and past the sealing mechanism 32, which mechanism seals the mouth 28 of the pouches as will be described hereinafter, the cooked and sealed pouches are moved out of the housing 150, are cooled by water sprayed from a cooling system 168 and are thereafter removed from the conveyor. The cooling water may be collected in a trough 169 for subsequent discharge.

As illustrated in FIG. 10, the conveyor 165 is continuously driven by motor 170 and chain drive 172 and is guided along a vertical zig-zag path so as to move the container alternately through the hot water and through the steam during sterilization. In this way the pouches P are repeatedly immersed in hot water which causes the pouches to collapse and the gases therein to be expelled through the one-way valve. It will be understood, however, that if it is desired to reduce expulsion of hydrogen through the one-way valve, that the zig-zag conveyor path may be eliminated and replaced by a conveyor path which moves the pouches P horizontally with the lower portions of the pouches immersed in the hot water.

When processing fruit for example, at 212° F. in the atmospheric sterilizer 29, it is recognized that an average cooking time for the fruit is about 15 minutes. It is further recognized that at these low temperatures it requires close to 15 minutes for the water to diffuse through the inner plastic layer and for the hydrogen to diffuse back through the layer when the inner layer of the pouches are relatively thick, i.e., about 3–5 mils. It is further recognized that a reduction in the thickness of the inner layers of each pouch reduces the reaction time and thus permits more hydrogen to be formed within the container during the time allowed for cooking.

In accordance with a second embodiment of the invention pouches are filled with a low acid food product such as vegetables or meat, which product requires a high sterilization temperature and a relatively long cooking period. These products are sterilized in a superatmospheric sterilizer 30 (FIG. 11) after first being clamped in the carriers 146a in a manner which forms a one-way valve across the mouth 28 of each pouch P as previously described. The superatmospheric sterilizer 30 is in the form of a hydrostatic cooker and includes a cooking chamber 180 that is defined by two walls 182, a roof 186, and two depending walls 188 and 190 all of which are secured together in pressure tight relationship. The lower end of the cooking chamber 180 opens into a water filled trough 192 which is formed by the two walls 182, a transverse horizontal floor plate 194 and the lower end portions of two transverse vertical walls 196 and 198. The wall 196 cooperates with another transverse vertical wall 200 to define an inlet hydrostatic water leg 202; and the wall 198 cooperates with a transverse vertical wall 204 to provide an outlet hydrostatic water leg 206. The hydrostatic legs 202 and 206 communicate with the trough 192 and are filled with water from conduits 208 and 209 so as to create sufficient pressure to resist the pressure of steam in the cooking chamber 180. Steam at about 250° F. and 15 p.s.i. gauge is directed into the cooking chamber 180 through a valved conduit 210. The water in the trough 192 is heated by steam from a thermostatically controlled steam manifold 212, and cool water is directed into the cooling or outlet leg 206 from the conduit 209 and is discharged from the lower end of the leg through valved conduit 214.

An endless processing conveyor 216 having carriers 146a, which may be identical to the carriers 146 (FIG. 14), pivotally supported thereon is trained through the inlet leg 202, along a zig-zag path through the cooking chamber 180, and through the outlet leg 206. The pouches P are preferably sealed when in the steam atmosphere within the cooking chamber 180 immediately prior to moving out of the chamber by a sealing mechanism 32a which may be identical to the mechanism 32 (FIG. 13).

It is recognized that it is desirable to process certain products such as cereals at high temperatures after the products have first been sealed in pouches. For example, the filled pouches P may be first moved through and sealed while in the atmospheric sterilizer 29 (FIG. 10) of the first embodiment of the invention so as to preheat the product and purge most of the headspace gases therefrom. The sealed pouches P may then be passed through the superatmospheric sterilizer 30 (FIG. 11) for high temperature processing. When processing in this way, it will be recognized that a single endless conveyor may be trained through both sterilizers 29 and 30 and that the sterilizers may be constructed as a single unit.

In accordance with the teaching of the present invention it is also recognized that high pressure sterilization of sealed flexible containers will result in the formation of hydrogen within the sealed containers or pouches which will cause the internal pressure to exceed the pressure externally of the pouches thus causing the pouches to burst, or tend to burst, if processed in a pure steam atmosphere. Accordingly, the steam within the cooking chamber 180 may be mixed with high pressure air from a valved conduit 218 so as to provide an overriding air pressure which is in excess of the combined pressure of condensible and non-condensible gases within the pouches P. It will be understood, of course, that the condensible gases in each pouch will condense when passing through the cooling water in the outlet hydrostatic leg 206 thus providing a hydrogen rich mixture of gases within each pouch which mixture of gases is substantially at atmospheric pressure.

In accordance with the third embodiment of the invention, pouches P are filled, evacuated by apparatus such as that disclosed in the previously mentioned Grafingholt Pat. No. 2,966,019, and are sealed prior to being discharged from the evacuating chamber of the Grafingholt apparatus by a sealing mechanism that is substantially the same as the mechanism 32 disclosed in FIG. 13. The filled, evacuated and sealed pouches are then placed in retort cooker 34 (FIG. 12) which includes a housing 232, a perforated basket 234 for supporting the pouches P, and a cover 236 which is removably secured in pressure tight relationship to the housing 232. The retort cooker 34 is filled with water to the level of the upper ends of the pouches from a valved conduit 238. This water is heated to a cooking temperature of about 250° F. at 15 p.s.i. gauge by steam which enters the cooker 34 from a valved conduit 240. High pressure air at about 12 p.s.i. greater than the sterilizing pressure is directed into the cooker 34 through a valved conduit 242 so as to provide an overriding pressure which will prevent the pouches from bursting because of excessive build up of pressure within the pouches due partially to the formation of hydrogen therein. It will be understood, of course, that the pressure of hydrogen and other noncondensible gases in the pouches P will combine with the saturated steam formed within the pouches to provide a total internal pressure that exceeds the pressure of saturated steam outside the pouches.

After the sealed pouches P have been sterilized, the hot water is drained from the cooker 34 through valved conduit 244 and is replaced by cold water from conduit 238. After the pouches P have been cooled and the condensible gases within the pouches have condensed, the cover 236 is removed from the housing 232 and the sterilized and sealed pouches P are removed from the cooker.

In each of the three embodiments of the invention described above, a sealing mechanism 32 of the type disclosed in FIG. 13 may be employed. The specific details of the sealing mechanism 32 are substantially as disclosed and claimed in my copending application Ser. No. 860,335.

When the sealing mechanism 32 is used with either the atmospheric sterilizer 29 (FIG. 10) or the superatmospheric sterilizer 30 (FIG. 11) of the first two embodiments of the invention, the continuously moving conveyor 165 (FIG. 10) or 216 (FIG. 11) having the carriers 146 or 146a thereon moves the pouches P past the sealing mechanism 32 or 32a.

The sealing mechanism 32 (FIG. 13) is supported by a shaft 250 which provides pivotal support for the mechanism thereby allowing sealing bars 252 and 253 to move with the conveyor during sealing. A pair of spaced downwardly extending arms 254 (only one being shown) are secured to the shaft 250 and have a pivot shaft 256 journaled in their lower ends. A carriage 258 which includes two spaced cam plates 260 (only one being shown) is guided for reciprocal movement in a substantially vertical direction by the arms 254. Each cam plate 260 has a pair of generally horizontal slots 262 and 264 therein. The sealing bar 252 is secured to a pair of spaced levers 266 (only one being shown) which levers are pivoted at their lower ends about the pivot shaft 256 and have a guide rod 268 secured to their upper ends that extends through the slots 262. Similarly, the sealing bar 253 is secured to a pair of spaced levers 270 (only one lever being shown) which levers are pivoted at their lower ends about the pivot shaft 256 and have a guide rod 272 secured to their upper ends and extending through the slots 264.

A cylinder 274 of a pneumatic power unit 276 is connected to the rod 268, and its piston rod 278 is pivotally connected to the rod 272. Thus, when high pressure air is directed into the cylinder 274 in a direction which will extend the piston rod 278, the sealing bars 252 and 253 are moved into sealing engagement with the mouth 28 of the pouch P thereby sealing the same. High pressure air directed into the other end of the cylinder 274 will cause the sealing bars 252 and 253 to pivot away from each other. When the sealing mechanism 32 is employed with the continuously moving conveyors as mentioned above, a locking finger 280 is moved downwardly into engagement with a conveyor by a pneumatic cylinder (not shown) when a pouch has moved into position to be sealed thereby causing the conveyor 165 to bow downwardly and also causing the sealing bars 252 and 253 to move with the conveyor during sealing.

In accordance with the present invention, the sealing bar 252 has a curved pouch engaging surface 282 (FIG. 13A) with a radius of curvature of less than about 1/16 of an inch. The sealing bar 253 has a flat pouch contacting surface which engages the other outer surface of the pouch. Both sealing bars 252 and 253 are heated to a bonding temperature of between about 250° F. to 325° F., preferably about 300° F. by electrical heating elements 284. It has been found that a sealing pressure of about 7–20 pounds per linear inch of seal applied for between about one second to five seconds, preferably about two seconds, is sufficient to extrude all of the plastic of both inner layers away from the seal line 286 (FIGS. 4 and 17) thus causing the aluminum layer of one wall to substantially contact the aluminum layer of the other pouch wall. Since the seal line 286 crosses the previously formed pouch seam line as indicated in dotted lines in FIG. 4, it will be apparent that the product and gas within the sealed pouch is completely surrounded by a gas inhibiting aluminum barrier.

It is also to be understood that the mouth of the pouch may be sealed by a movable sealing surface such as that disclosed in FIGS. 5 and 6 wherein a single movable sealing head may be substituted for the sealing bar 252 (FIGS. 13 and 13a).

It is also within the scope of the invention to form the pouch seams and seal the mouth of the pouch with conventional apparatus, and after the pouch has been sterilized to reseal all edges of the pouch to provide substantial aluminum-to-aluminum contact between the pouch walls at all sealed areas. This resealing may be accomplished by a single apparatus such as that shown in FIGS. 1 and 2 with an additional small diameter sealing bar added thereto, or by first sealing two edges with the type of apparatus disclosed in FIG. 6 and thereafter turning the pouch 90° and sealing the other two edges.

It has been discovered that food filled pouches that have been processed and sealed as above described have a much longer storage life than do pouches which are processed and sealed in the conventional manner. It is believed that this improved storage life is attributed to two main factors.

The first factor is that the headspace gases which are sealed within each pouch are rich in hydrogen which is an inert gas. The hydrogen is not injurious to the product within the pouches, and tends to dilute the small amount of oxygen which remains in the headspace of each pouch. Thus, the presence of hydrogen within the headspace of the pouches P is desirable for increasing storage life of the containers since it prevents an oxygen rich gas from causing rapid oxidation of the contacted food product.

However, it is recognized that hydrogen diffuses rapidly through the inner layer of polyolefin or heat sealable polyester when the edges of the pouches P' are sealed in the conventional manner as diagrammatically illustrated in FIGS. 15 and 16. Since hydrogen diffuses out of this inner layer about eight times as fast as oxygen diffuses through the inner layer into the pouch P', the resulting effect is that the headspace H' collapses somewhat as illustrated by the headspace H" in FIG. 16 thereby causing the gas remaining in the headspace to become rich in oxygen. This causes oxidation and spoilage to occur on the contacted upper or exposed surfaces of the product at 290 (FIG. 16). It is also realized that the hydrogen not only diffuses through the conventionally sealed edges at the headspace H' but also slowly diffuses through the food product, at about the same rate per linear inch as through the inner layer of plastic, and through those conventionally sealed edges in contact with the product. Thus, when using pouches P" that are formed out of a single folded sheet of laminate as illustrated in FIG. 18, the storage life of the product is improved by storing the pouches with the illustrated folded edges uppermost or with all sealed edges below the liquid level within the pouches.

Accordingly, the second main factor in improving storage life is to seal all edges of each pouch in accordance with the method of the present invention so as to provide a substantially complete aluminum or aluminum oxide barrier around the product within the pouch. Although for all practical purposes aluminum-to-aluminum contact is made at the seam lines when formed as shown in FIGS. 17, 19 and 20 as previously mentioned, it is recognized that a very minute layer of bonding agent or adhesive 27 (FIG. 20) remains between the two contacting aluminum surfaces. This bonding agent was originally applied to the laminate, during the manufacture of the triple film laminated packaging material, between the aluminum foil layer and the pastic film layers to bond the two layers together. This adhesive 27 aids in bonding the two aluminum surfaces of the sealed pouch together and is so thin, being on the order of 0.1 mil in thickness per wall, as to allow only negligible amounts of gases to diffuse therethrough.

It is recognized that gases will diffuse slowly through pure aluminum but that the pure aluminum is about 100 times better than polyolefin as a barrier. It has also been discovered that the aluminum oxide 29 (FIG. 21) formed on the inner and outer surfaces of the aluminum foil in the pouch wall during heat treatment in accordance with the present invention provides a substantially complete barrier against diffusion. In this regard, tests were made to determine the thickness of the different layers in the walls of pouches before processing and after processing for 15 minutes at 250° F. The results of the tests are as illustrated in FIG. 21 and are as follows:

| Layers in wall | Before processing (mils) | After processing (mils) |
| --- | --- | --- |
| 20____ Polyester (outer) | 0.5 | 0.5 |
| 27____ Adhesive | 0.1 | 0.1 |
| 29____ $Al_2O_3$ | 0.002 | 0.02 |
| 22____ Al | 0.35 | 0.32 |
| 29____ $Al_2O_3$ | 0.002 | 0.01 |
| 27____ Adhesive | 0.1 | 0.1 |
| 24____ Polyolefin (inner) | 3.0 | 3.0 |

Another test was made to determine the headspace volume when handling a first group of pouches filled with water, and a second group of pouches filled with peas and with only enough water to form steam in the pouches during processing. The results of these tests are shown in Table 1.

TABLE 1.—HEADSPACE VOLUME (CC.)

| Time | Water | | | | Peas (very little liquid) | | | |
| --- | --- | --- | --- | --- | --- | --- | --- | --- |
| | Total | Air | $H_2O$ | $H_2$ | Total | Air | $H_2O$ | $H_2$ |
| 0 min | 45 | 44 | 1 | | 90 | 88 | 2 | |
| Heated 250° F: | | | | | | | | |
| 0 min | 0.5 | 0.5 | 0.01 | | 40 | 39 | 1 | |
| 5 min | 0.5 | 0.01 | 0.5 | t | 40 | 10 | 30 | t |
| 10 min | 0.3 | t | 0.3 | t | 40 | 0.4 | 39 | 0.4 |
| 20 min | t | t | t | t | 40 | 0.01 | 40 | 0.4 |
| Cooled: | | | | | | | | |
| 2 hr | t | t | t | t | 0.4 | 0.01 | 0.01 | 0.4 |
| 6 mo | t | t | t | t | 0.05 | 0.05 | t | t |

In conducting this test the filled but unsealed pouches were first provided with one-way valves in their open mouths by applying a tensioning force across the mouth of each pouch in the manner previously described and as fully disclosed in my copending application Ser. No. 693,330, now Pat. No. 3,501,318. The headspace of certain of the pouches was then measured and recorded prior to submergence. Other pouches were then submerged in water at 250° F. and were sealed at the end of their test times and thereafter headspace measurements were taken and recorded. Headspace measurements of the pouches treated for 20 minutes were then taken two hours after removal from the hot water, and were again taken six months thereafter. Each headspace measurement included the total volume in cubic centimeters; and the proportion of air, water vapor ($H_2O$), and hydrogen ($H_2$) in the total headspace. Some of these measurements were in part, calculated from known relationships.

As indicated in Table 1, a large portion of air was purged through the one-way valve in each pouch immediately upon submergence. Thereafter, steam and hydrogen formed in the pouch gradually purged substantially all of the air out of the pouches. It will be noted that after ten minutes of processing the headspace of the water filled pouches were reduced to such an extent that only a trace ($t$) of air and hydrogen was present therein. The volume of air and hydrogen was so small that it could not be reliably measured. It was recognized, however, that as processing continued these volumes became smaller. The total headspace of the water filled pouches also reduced to an unmeasurable amount during heat treatment because of vibrations and slight fluxuations in the water temperature which caused the pouch walls for all practical purposes to completely collapse against the water within the pouches.

It will be noted that the pouches having peas and a very small amount of water therein has a much greater headspace because of the space between the individual peas. It will also be noted that two hours after cooling the remaining headspace volume is substantially all hydrogen, but that after six months of storage only a trace of hydrogen and water vapor remains in the headspace and the headspace has diminished in size and is substantially all air. The reason for this decrease in headspace volume and gradual change from substantially all hydrogen in the headspace to substantially all air in the headspace after prolonged storage is that hydrogen diffuses out of the pouches and oxygen plus nitrogen diffuses into the pouches through the heat sealable inner plastic layers at the seam lines. The rate of diffusion of hydrogen out of the pouches is about eight times faster than the rate of diffusion of oxygen into the pouches, thus reducing the total headspace volume during prolonged storage. It has also been determined that if the pouches are sealed so that the inner plastic layers are substantially extruded from the seal areas thereby providing substantial aluminum-to-aluminum contact at all seal areas, an aluminum oxide envelope will surround the product and will cause the headspace to remain about the same as that shown for the two hour period even after the pouches have been stored for about six months.

From the foregoing description it is apparent that the present invention includes a method and apparatus for forming, processing and sealing pouches in a manner which will control diffusion of gases out of or into the pouches. The invention also provides a product filled pouch which is formed and sealed in such a manner as to prevent diffusion of gases into or out of the pouches and accordingly increases the storage life of the product packaged therein.

Although the best mode contemplated for carrying out the present invention has been herein shown and described, it will be apparent that modification and variation may be made without departing from what is regarded to be the subject matter of the invention.

What I claim is:

1. The method of packaging a water-containing food product or the like for maintaining oxygen free storage, comprising the steps of introducing the product into an open pouch having walls of plastic-aluminum laminate each of which includes an aluminum layer laminated to an inner layer of heat sealable plastic with the edges of the pouch seamed so as to provide seams of substantial aluminum-to-aluminum contact between the walls and leaving a headspace in the pouch, removing air from the headspace, sealing the open end of the pouch by extruding sufficient amounts of the inner plastic layer so that the aluminum of one wall substantially contacts the aluminum of the other wall to define an aluminum-to-aluminum seam, and subjecting the pouch to an external heat treatment medium at a temperature above about 212° F. for a period sufficient for causing water from the product to diffuse as discrete molecules through the inner plastic layers and react with the aluminum forming diffusion inhibiting aluminum oxide on the inner surfaces of the aluminum layers including all of the seam areas and forming hydrogen which collects in the pouch, said aluminum oxide serving as a barrier to preclude diffusion of hydrogen out of the pouch and oxygen into the pouch.

2. A method of packaging according to claim 1 wherein substantially all of the heat sealable plastic of said unsealed edges of the pouch is extruded out of said areas to provide substantially aluminum-to-aluminum contact at the seam in a strip that is between 1/8 inch to 3/8 inch wide.

3. A method of packaging according to claim 1 wherein a sealing force of about 7–20 pounds per linear inch is applied to said unsealed edges forming seal areas having radii of curvatures between about 1/64 to 1/16 of an inch, and wherein said pressure is maintained on said edges for between about 2 to 6 seconds while said edges are heated to a temperature of between about 250° F. to 325° F.

4. A method according to claim 1 wherein the mouth of the pouch is sealed after the pouch has been subjected to said aqueous heat treatment medium and wherein aluminum oxide formed on one wall substantially contacts the aluminum oxide that is formed on the other wall when the pouch is sealed.

5. The method of packaging a water-containing product for maintaining oxygen free storage, comprising the steps of introducing the product into an open pouch having walls of plastic-aluminum laminate each of which includes an aluminum layer laminated to an inner layer of heat sealable plastic and an outer layer of polyester with the edges of the pouch seamed so as to provide seams of substantial aluminum-to-aluminum contact between the walls and leaving a headspace in the pouch, removing air from the headspace, sealing the open end of the pouch by extruding sufficient amounts of the inner plastic layer so that the aluminum of one wall substantially contacts the aluminum of the other wall to define an aluminum-to-aluminum seam, and subjecting the exterior surfaces of the pouch to an aqueous heat treatment medium at a temperature above about 212° F. for a period sufficient for causing water from the product to diffuse as discrete molecules through the outer polyester layers and react with the outer surfaces and the edges of the inner surfaces outside the seam lines of the aluminum layers forming diffusion inhibiting aluminum oxide on the outer surfaces of the aluminum layers, said aluminum oxide serving as a barrier to preclude diffusion of oxygen into the pouch.

6. The method of packaging a water-containing product in diffusion controlling pouches having two walls of plastic-aluminum laminate each of which includes an aluminum layer having an inner layer of heat sealable plastic comprising the steps of forming a pouch having an open mouth by application of sufficient heat and pressure upon all unsealed edges of the pouch except the mouth for forming seams having the inner plastic layer extruded therefrom so that the walls at the seam lines are in substantial aluminum-to-aluminum contact and the layers of heat sealable plastic adjacent thereto are bonded together, filling the pouch with a water containing product, evacuating a substantial portion of the headspace gases from the pouch, heat treating the product for sterilizing the product and for causing the water from the product in its molecular state to diffuse as discrete molecules through the plastic inner layer of each wall for forming aluminum oxide on the inner surfaces of the aluminum layers and for forming hydrogen which diffuses back through the inner layers and collects in the pouch, and sealing the mouth of the pouch by applying sufficient heat and pressure to extrude a portion of the inner plastic layers from the seal area thereby providing substantial aluminum oxide-to aluminum oxide contact between the two walls of the seal area.

7. A method of packaging according to claim 6 wherein the outer surfaces of the wall of each pouch are subjected to an aqueous heat treatment medium raised to a sterilizing temperature and wherein the aqueous medium causes aluminum oxide to form on the outer surfaces of the aluminum layers.

8. A method of packing according to claim 7 wherein the heat treatment medium is steam maintained at a temperature of about 250° F.

9. A method of packing according to claim 7 wherein the heat treatment medium is water at substantially 212° F. and each pouch is subjected to said medium for a period in excess of about 15 minutes.

10. A method of packaging according to claim 7 wherein each pouch wall has an outer layer of polyester laminated to the outer surface of the aluminum layer and wherein the aqueous heat treatment medium diffuses as discrete molecules through said outer layer to form aluminum oxide on the outer surface of the aluminum layer.

11. A method of packaging according to claim 6 wherein substantially all of the heat sealable plastic of said unsealed edges of the pouch is extruded out of said edges to provide a strip of seam area which is about 1/8" to 3/8" wide along each of said seams.

12. A method of packaging according to claim 6 wherein a sealing force of between about 7–20 pounds per linear inch is applied to said seams and to said mouth having radii of curvatures between 1/64 to 1/16 of an inch during pouch forming and sealing, and wherein said pressure is maintained on said seams and on said seal area for between about 2 to 6 seconds while at a temperature of between about 250° to 325° F.

13. A method of packaging according to claim 6 and additionally including the step of providing a one-way valve across the mouth of the pouch, and wherein the pouch is partially evacuated during heat treatment by immersing the pouch at least once in hot water.

14. A method of packaging according to claim 13 wherein the evacuation is accomplished by repeated immersions in hot water, and wherein the mouth of the pouch is sealed prior to completion of heat treatment.

15. A method of packaging according to claim 6 wherein each pouch is sealed after partial heat treatment and prior to complete sterilization thereby controlling the amount of hydrogen retained in the pouch after heat treatment is completed.

16. The method of packaging a water-containing food product or the like for maintaining oxygen free storage, comprising the steps of introducing a water containing product into an open pouch having walls of plastic-aluminum laminate each of which includes an aluminum layer laminated to an inner layer of heat sealable plastic with the edges of the pouch seamed together and leaving a headspace in the pouch, removing air from the headspace, sealing the open end of the pouch, subjecting the pouch to an external heat treatment medium at a temperature of about at least the boiling point of water and between 212° F. and 250° F. for causing water from the product to diffuse as discrete molecules through the inner plastic layers and react with the aluminum forming diffusion inhibiting aluminum oxide on the inner surfaces of the aluminum layers and forming hydrogen which collects in the pouch, and resealing the seams and sealed end of the pouch so as to provide substantial aluminum oxide-to-aluminum oxide contact between the walls of the seam and the seal areas, said aluminum oxide serving as a barrier to preclude diffusion of hydrogen out of the pouch and oxygen into the pouch.

References Cited
UNITED STATES PATENTS

| | | | |
|---|---|---|---|
| 2,380,134 | 7/1945 | Waters | 99—214 |
| 2,966,019 | 12/1960 | Grafingholt | 53—86 |
| 3,108,881 | 10/1963 | Shaw et al. | 99—171 X |
| 3,261,140 | 7/1966 | Long et al. | 99—171 H |

(Other references on following page)

UNITED STATES PATENTS

| | | | |
|---|---|---|---|
| 3,377,173 | 4/1968 | Van der Winden | 99—214 |
| 3,395,025 | 7/1968 | Hermanson | 99—171 H |
| 3,481,688 | 12/1969 | Craig et al. | 21—56 |
| 2,956,677 | 10/1960 | Kavadlo et al. | 229—3.5 |
| 3,528,826 | 9/1970 | Wilson | 99—171 |

FOREIGN PATENTS

| | | | |
|---|---|---|---|
| 841,015 | 7/1960 | Great Britain | 99—171 H |

OTHER REFERENCES

Encyclopedia of Chemical Technology (1963), vol. 2, Kirk-Ottmer, p. 2.

WILBUR L. BASCOMB, JR., Primary Examiner

C. P. RIBANDO, Assistant Examiner

U.S. Cl. X.R.

99—214; 229—3.5 MF; 161—214, 216, 225

PO-1050
(5/69)

UNITED STATES PATENT OFFICE
CERTIFICATE OF CORRECTION

Patent No. 3,625,712      Dated December 7, 1971

Inventor(s) DONALD C. WILSON

It is certified that error appears in the above-identified patent and that said Letters Patent are hereby corrected as shown below:

Col. 5, line 12, change "69" to -- 59 --.
Col. 6, line 47, after "valve" change "82" to -- 82a --.
Col. 13, line 64, delete "in its molecular state".

Signed and sealed this 4th day of July 1972.

(SEAL)
Attest:

EDWARD M. FLETCHER, JR.
Attesting Officer

ROBERT GOTTSCHALK
Commissioner of Patents